United States Patent

Ballurio et al.

[11] Patent Number: 5,842,212
[45] Date of Patent: Nov. 24, 1998

[54] DATA MODELING AND COMPUTER ACCESS RECORD MEMORY

[75] Inventors: Keith B. Ballurio, Mansassas; Matthew R. Edelstein, Arlington; Brian B. Puckett, Oakton, all of Va.

[73] Assignee: Information Project Group Inc., Herndon, Va.

[21] Appl. No.: 610,945

[22] Filed: Mar. 5, 1996

[51] Int. Cl.[6] .................................................. G06F 17/30
[52] U.S. Cl. .............................................. 707/100; 707/1
[58] Field of Search ........................... 707/1, 2, 101–102

[56] References Cited

U.S. PATENT DOCUMENTS

| | | | |
|---|---|---|---|
| 5,201,046 | 4/1993 | Goldberg et al. | 707/100 |
| 5,257,185 | 10/1993 | Farley et al. | 707/100 |
| 5,311,438 | 5/1994 | Sellers et al. | 364/468.02 |
| 5,566,333 | 10/1996 | Olson et al. | 707/102 |
| 5,590,360 | 12/1996 | Edwards | 707/102 |
| 5,710,917 | 1/1998 | Musa et al. | 395/681 |

FOREIGN PATENT DOCUMENTS

WO 90/08360  7/1990  WIPO .

*Primary Examiner*—Paul V. Kulik
*Attorney, Agent, or Firm*—Fulbright & Jaworski LLP

[57] ABSTRACT

The system and apparatus for loading and retrieving information relates to a computer-implemented database management system for multiple source databases. The system also has a variety of database management tools. The system uses hierarchical, network, and relational structures to establish and maintain relationships between disparate categories of information in multiple records or databases within the system. Data entered into the system are stored in a common data repository in disk memory, which categorizes each source field independent from the source record definition. Separating the source record definition from the fields within each source record definition allows data to remain independent from the original structure of the information. Yet, source record definitions are maintained to show the relationships between data from different fields. The system allows all data to be referenced by any number of methods without regard to how the data was entered into the system. The system also allows any data modeling record (DMR) in the system to act as a menu, filter, or gateway to other DMRs or applications and to provide a data security system which gives a database manager sophisticated control of access to all DMRs and applications within the system. The system also provides for continuous modification of the database without any system down-time.

6 Claims, 9 Drawing Sheets

| SOURCE TABLE A : MANUFACTURER ORDERS | | | | | | | |
|---|---|---|---|---|---|---|---|
| DEALER NO. | DATE OF ORDER | CUSTOMER NAME | YEAR OF CAR | MODEL OF CAR | ITEM # | QUANTITY | WARRANTY INFORMATION |
| | | | | | | | |
| | | | | | | | |

FIG. 3

SOURCE TABLE B : REPLACEMENT PARTS ORDERS

| NAME | ADDRESS | MAKE | MODEL | CATALOG # | DESCRIPTION | COLOR | QUANTITY |
|---|---|---|---|---|---|---|---|
|  |  |  |  |  |  |  |  |

CONTINUED BELOW

| PRICE PER ITEM | SUBTOTAL | TAX | SHIPPING | TOTAL | PAYMENT TYPE | ACCOUNT # |
|---|---|---|---|---|---|---|
|  |  |  |  |  |  |  |

FIG. 4

|             | SECURITY LEVEL |   |   |   |   |   |   |   |
|-------------|---|---|---|---|---|---|---|---|
|             | 1 | 2 | 3 | 4 | 5 | 6 | 7 | 8 |
| ADD/REMOVE/MODIFY USERS         |   |   |   |   |   |   |   | X |
| ADD/REMOVE/MODIFY NETWORK LINKS |   | X | X | X |   |   |   | X |
| ADD/REMOVE/MODIFY DOCUMENTS     |   |   |   |   | X | X |   | X |
| ADD/REMOVE/MODIFY ROOT DMRs     |   |   |   |   | X |   |   | X |
| ADD/REMOVE/MODIFY non-ROOT DMRs |   |   |   |   |   | X | X | X |
| ADD/REMOVE/MODIFY FIELDs        |   |   |   |   | X | X | X | X |

FIG. 8

DATA MODELING AND COMPUTER ACCESS RECORD MEMORY

BACKGROUND OF THE INVENTION

1. Field of the Invention

This invention relates to an information management system, particularly a system suitable for developing and administering large and complex centralized or distributed databases. Unlike conventional database systems, the system and apparatus for loading and retrieving information does not store data records in static, structured tables or files. Instead, the system stores all data in a common data repository. The data stored in this repository are "independent" of the source records and the source fields used for data entry and display. The system allows hierarchical, network, and relational dynamic record alignment, which provides multiple database managers with the flexibility to structure data according to each manager's needs.

2. Discussion of the Related Technology

Conventional database systems store records containing data in static tables. Each table has a number of predetermined fields that are often represented as columns, and each record, often represented as a row, contains information corresponding to each predetermined field. A manager using conventional database technology must initially determine how to structure information into fields and records. The manager must decide the types of fields that will be used to store different categories of data and the collection of fields that will be used to construct tables of information. A drawback to this traditional approach to database technology is that a single table is unable to store multiple records that have some type of relationship yet do not contain identical fields. In order to cross-reference related information from one table to another, a manager must conduct multiple searches across a number of tables or even databases. As the relationships between desired information becomes more and more complex, a manager must conduct many searches to obtain a complete set of cites or references. To avoid conducting multiple searches, a manager may simply store data in a raw text block and employ a full text query to search for relevant information. This solution, while avoiding the problem of multiple searches, prevents a manager from itemizing or categorizing data found using the query and also prevents a manager from using fields to further describe the information found.

Conventional database systems link tables either as a hierarchical, a network, or a relational system. A hierarchical database structure uses one-way pointers to relate tables together in a fixed parent-to-child relationship. A hierarchical database constructs a one-to-many relationship between tables that looks like a tree. This hierarchical structure aids in understanding the relationship of a particular table with respect to other tables in the hierarchy, yet this rigid relationship limits the types of information that can be available on any particular table in the hierarchy.

A network database structure is similar to a hierarchical structure in that tables are related in a fixed manner using pointers. A network structure, however, uses two-way pointers to create a many-to-many relationship between tables that looks more like a web than a tree. A network structure has duplexed relationships between tables, rather than the one-way parent-child relationships of a hierarchical structure. A network database system, however, can support a pure hierarchical structure as required.

Both the hierarchical and network database structures are based on a knowledge of the fixed location of tables. These structures are called navigational structures, which imply that a browsing user can understand the relationships between tables simply by traversing the structure. These navigational structures, however, sometimes suffer from the requirement of rigid pre-established relationships and the possibility of contamination of the one-way and two-way pointer chains. For the most part, hierarchical and network databases have been supplanted by relational databases, because relational databases do not require pre-planned relationships.

A relational database structure is not a navigational structure and does not have fixed pointers from one table to another. A relational structure consists of indices that are not limited to a hierarchical structure, but nevertheless relate records to each other. Relational databases operate using the principle of commonality between record formats to relate records to each other. For example, a "Name and Address" table might contain a "Customer Number." Associated tables, such as "Customer Orders," "Customers Handled," "Credit Profiles," and "Customer Complaints" might also include a "Customer Number" field, which would be used to associate records in the various tables.

Processing in a relational database structure occurs at different times depending on the action that is taken by a user. For example, when a user performs a query against a table, the internal structures of a relational database are actioned to do things such as hold the table name, look into the system tables for any necessary contained or associated information (by key values or columns, etc.), point to the physical file location of the data, and place some of it (dependent on system global settings) into memory. All of these differing types of system relational database actions then are stored or held as the last actions, so that the next action will be "short cut" if it is in the same vein or for the same kind of information. Generally speaking, the type, number, and content of the actions that the relational database takes to "process" any user request is based on the request type.

Relational database indices can be either single-key or multiple-key. A single-key index is one column, usually with entries in an ascending or descending order, that point to individual records. In the example above, a single-key index could be a list of customer numbers in ascending order. A multiple-key index uses more than one column and allows several columns to point to the same record. In the example above, a second index could be a list of customer surnames in alphabetical order.

Relational linkage structure enables records to be accessed and viewed from different perspectives, however, relational indices do not convey the relationship between individual records as well as hierarchical and network tables do. Also, hierarchical and network databases retrieve queries faster and use less computer processing power than relational databases, because the relationships in hierarchical and network databases are pre-established.

SUMMARY OF THE INVENTION

The system and apparatus for loading and retrieving information is a computer-implemented superstructure over an existing relational database management system. The system uses hierarchical, network, and relational structures to establish and maintain relationships between data, fields, and records in the system. Initially, the system uses hierarchical structures to order massive amounts of information possibly obtained from various disparate, distributed sources. Next, the system uses a network structure to cross-reference related data residing in different hierarchical structures. Finally, the system uses a relational structure to access the various hierarchical and network structures and report results of user queries.

The system establishes in memory a common data repository for disparate data with disparate record structures originating from different sources within an organization or many different organizations. The common data repository is held on disk located in the server. The system holds some (the most recent) information in the physical memory of the server, but all data is held in permanent storage on disk. Depending on the hardware platform chosen, and the operating system used by that platform, the physical storage of the repository is limited only by the number of servers and drives of the linked system. Almost all current hardware and operating system platforms allow for the connection and sharing of distributed information across multiple machines of the same type, therefore, the repository for all intents and purposes, can be unlimited.

When source data enters the system, the common data repository stores each source field independently from its source record definition. In order to define the storage parameters at the field level of the system, the basic storage unit, a "block," needs to be introduced. The system exploits a variable length character field structure to store the field definitions and other information in a computer's storage devices in a single, variable length, appendable flat file. These variable length character fields are formed into a base data storage unit called a block. Each block contains a Record Type ID, chain reference information, a unique Record ID, an Aspect string for referential integrity, several internal system IDs, and a data array that is a matrix of one hundred positions that can grow to 175 characters each. Then for each data modeling record (DMR) in the database, there is at least a root block and any number of additional blocks that identify that DMR as having multiple relationships to other DMRs and fields.

In this manner, the system can store each DMR and field independently and in relation to any number of other fields and DMRs. Thus, the source record definition does not determine the structure of the data storage, instead it merely provides a means for referencing data using relevant fields. In effect, the record definition resides "above" the common data repository and allows data to remain independent of the source record structure. The system unifies different DMR structures for purposes of uniform query reporting, and it allows individual application managers to manipulate and present data uniquely. One information manager may even point or link to another manager's data to create a virtual information management environment.

An advantage of this invention is that it facilitates multiple management of and multiple access to disparate data in computer memory without concern for the source field and source record structure of the data. Another advantage of this invention is that it provides a system that supports hierarchical, network, and relational record alignment. Other advantages of this invention are that it allows any record in the system to act as a menu, filter, or gateway to other records or applications and to provide a data security system that gives multiple information managers sophisticated control over access to data and applications within the system. Another advantage of the system is that it allows continuous modification of the data without computer system downtime.

BRIEF DESCRIPTION OF THE DRAWINGS

FIG. 3 shows a source field and source record structure for Table A.

FIG. 4 shows a source field and source record structure for Table B.

FIG. 8 shows a rights matrix.

DETAILED DESCRIPTION OF THE PREFERRED EMBODIMENT

The preferred embodiment is designed as a computer-implemented superstructure for use with existing relational database management systems (RDBMSs) such as Progress RDBMS, designed by PROGRESS Software Corp., Bedford, Massachusetts. RDBMS structure is processor intensive, because the retrieval of related records forces heavy processing by the database management system to establish current relationships.

In the preferred embodiment, however, heavy processing by the RDBMS is avoided because the RDBMS is used primarily to handle only single format blocks, several indices, and various user interaction interfaces, usually through a display screen. Using a computer, the system directs the creation of the common data repository, the hierarchical linking of data modeling records (DMRs), the network linking of blocks within a DMR, the query engine, the intelligent DMR, and the rights matrix.

Figure 1:
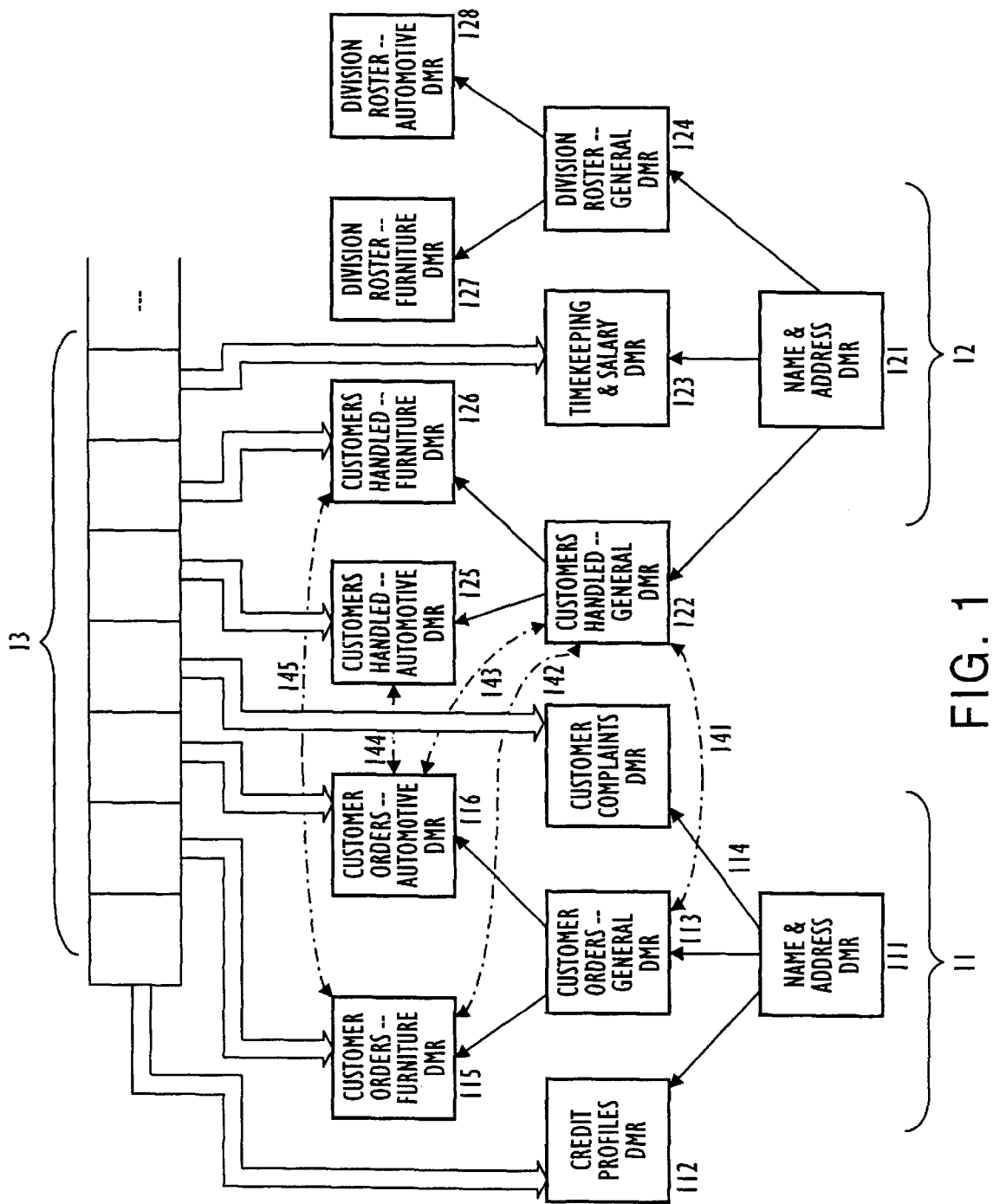
FIG. 1 shows a preferred embodiment using hierarchical, network, and relational structures.

The system supports hierarchical, network, and the relational structures. FIG. 1 shows related DMRs linked using hierarchical, network, and relational structures according to the preferred embodiment. Each hierarchy 11, 12 includes a single root DMR 111, 121 and multiple children DMRs linked using one-way pointers. Pointers, both one-way and two-way, are stored as references to the linked item within DMR blocks, specifically within each DMR's data array. For example, hierarchy 11 may represent a mail-order database for a mail-order company with one general division and two specialty divisions. Such a database may contain customer "Name and Address" DMR 111, customer "Credit Profiles" DMR 112, "Customer Orders—General" DMR 113, "Customer Complaints" DMR 114, "Customer Orders—Furniture" DMR 115, and "Customer Orders—Automotive" DMR 116. Hierarchy 12 may be a human resources database for the employees of the mail order company with employee "Name and Address" DMR 121, "Customers Handled—General" DMR 122, employee "Timekeeping and Salary" DMR 123, employee "Division Roster—General" DMR 124, "Customers Handled—Automotive" DMR 125, "Customers Handled—Furniture" DMR 126, "Division Roster—Furniture" DMR 127, and employee "Division Roster—Automotive" DMR 128. Note that in these hierarchical structures a user may browse from one DMR to the next only in the direction of the one-way arrows.

Several two-way pointers 141, 142, 143, 144, 145 establish network links between the two hierarchies 11, 12. Like one-way pointers, two-way pointers are stored references with the blocks at each end of the linked reference—A points to B, and B to A. These two-way pointers provide further perspective to the various DMRs. For example, the "Customer Orders—Automotive" DMR 116 of hierarchy 11 may be linked to the "Customers Handled—General" DMR 122 and to the "Customers Handled—Automotive" DMR 125 using, two-way pointers 143, 144 so that when a user views hierarchy 11, the user can also see whether a automotive division customer order was handled by an employee of the mail order company's automotive division, despite the fact that the "Customers Handled" DMRs are not children of hierarchy 11. Conversely, if a user is traversing hierarchy 12, the user can see related DMRs from hierarchy 11 through the network links even though those DMRs are not children of hierarchy 12. If desired, two-way pointers may also be established within a single hierarchy as well as between two hierarchies.

FIG. 1 also shows relational structure 13 with a single-key alphabetical index. The preferred embodiment uses a unified single-key alphabetical index into which every common repository DMR is placed. This index is held in the traditional RDBMS that is incorporated "under" the system and stored on a server's storage devices. Each key in the relational structure 13 has a one-to-one relationship with every DMR in each hierarchy 11, 12. This relational structure can be used to access quickly the various hierarchical and network structures. Note that the various hierarchical structures may be products of not only different divisions within a single company, but they may also be products of completely different companies.

The preferred embodiment is based upon the use of DMRs, rather than tables, as basic building units for hierarchical structures. Instead of a table structure dictating exactly what fields may be used in a particular database or data structure, data structure rules developed by individual managers control the development of a hierarchy. Data structure rules may allow only certain types of Record Types to be hierarchical children of a certain DMR. Information may be entered in a number of different ways depending on the number of Record Types a manager has created. Part of the root block content is the Record Type ID. All associated DMR blocks must contain the same Record Type ID. All DMR block information is held within the flat file on the services storage devices.

Record Types define the basic fields used in a particular type of DMR. For example, an "article" Record Type may contain "author," "title," "date of publication," and "Journal" fields, whereas a "chemical compounds" Record Type may contain "name," "date of discovery," "description," "use," and "chemical symbol" fields. According to a preferred embodiment, up to 1000 Record Types, such as persons, locations, bibliographic, books, conference, notes, topics, or projects, may be defined by multiple managers of the system.

Despite the fact that Record Types may be diverse and contain no common fields, a manager's data structure rules may allow these different Record Types to reside in a single hierarchy. This allows for great flexibility in entering and listing data. Thus, more than one data structure can contain a particular Record Type, and a Record Type may have any number of fields in common with another Record Type.

Figure 2:
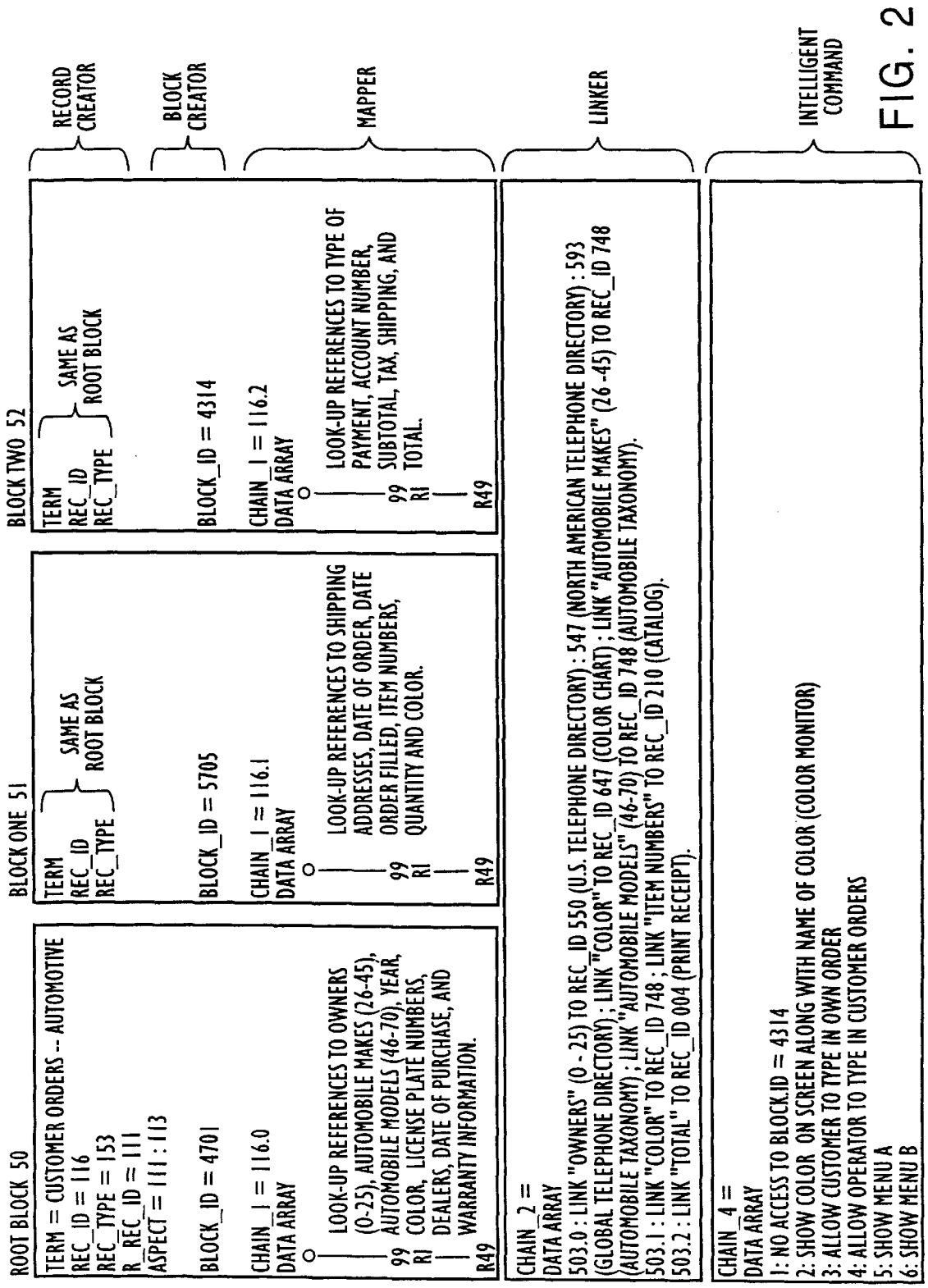
FIG. 2 shows a data modeling record (DMR) with three blocks incorporating data from Tables A and B.

FIG. 2 shows a DMR with three blocks incorporating data from Table A of FIG. 3 and Table B of FIG. 4. In a preferred embodiment, a DMR contains at least one and at most 999 blocks. If more blocks are needed in a single DMR, however, blocks from two or more DMRs can be bound together to make a larger DMR. Blocks are bound together as required by storing the next block sequence number in one of the Internal System ID areas of the "owning" block, be this the root block or one of the subsequent blocks. In this manner, blocks can be bound together in unlimited fashion.

A block may be created and maintained by a RDBMS such as Progress under the direction of the system. The block contents are stored as part of the contiguous single flat file on a server's storage devices. Each DMR contains at least a root block 50 as shown in FIG. 2. A DMR may also have one or more non-root blocks 51, 52. Both the root block and non-root blocks contain system fields. All blocks include the following system fields: Term (an alphanumeric general description of the DMR), Record Identifier (a real number unique for each DMR), Record Type, and Block Identifier (a real number unique for each block). Block types, either a root or a child, are differentiated in an internal system ID area of the block. The system has a global definitions methodology that defines the values to be stored for the different types. The system uses the underlying RDBMS to store the system global definitions. These are kept in separate flat files on the server machine.

In this example of DMR 116 from FIG. 1, the Term of the DMR is "Customer Orders—Automotive." The Record Type is "153," which a manager may define as the numeric identifier for an "automobiles" Record Type. Record Type 153 may contain the fields "owner," "make," "model," "year," "dealer," "color," "license plate number," "date of purchase," and "warranty information" as defined by a manager.

In addition to the system fields listed above, a root block contains two unique additional system fields that relate each DMR to a hierarchy: Root Record Identifier and Aspect. According to a preferred embodiment, each DMR has a place in one hierarchical database structure having a root DMR. The Root Record Identifier contains the Record Identifier of the root DMR in a DMR's hierarchical structure. The Aspect contains a string of Record Identifiers tracing the hierarchy of the DMR. The Root Record Identifier in this example is "111," which is the Record Identifier for the DMR with the Term "Name and Address" in the customer hierarchy 11 shown in FIG. 1. The Aspect, "111:113," represents that the DMR with the Record Identifier "113" is the parent of the instant DMR, and that the DMR with the Record Identifier "111" is the grandparent of the instant DMR. Every Aspect lists all of the parents of the instant DMR, from the direct parent to the root DMR of the hierarchy. Thus, the system fields indicate that the DMR shown is in a hierarchical structure of data for mail-order customers related to each other through customer order classification. The Root Record Identifier and the Aspect are used mainly to maintain the hierarchical referential integrity of the system.

Each block also contains a first data array called Chain-1. As mentioned previously, all of the block content is stored contiguously in a flat file on the system server. The title of the Chain-1 data array maintains the order of the blocks within a DMR. In the example shown in FIG. 2, the title of the Chain-1 array of the root block contains the Record Identifier plus the suffix ".0" while the title of the Chain-1 array of non-root blocks contain non-zero suffixes. The convention of the system is to indicate root blocks with the suffix ".0" in the Chain-1. Non-root blocks are usually assigned suffixes in ascending order.

A Chain-1 data array contains a single-column with the look-up references to data entries. In a preferred embodiment, a data array may have up to 100 alphanumeric look-up references and 50 real number look-up references. A look-up reference can refer to almost any type of data, such as alphanumeric characters, integers, decimals, date/time, program applications, graphic pictures, digitized voice, spread sheet data, or word processing data. A block may have an unlimited number of data entries, because two or more 150-field blocks may be bound together to compose a larger unitary block.

For example, FIG. 2 shows the contents of the root block data array 50 including look-up references to owners, automobile make and model, automobile color, and automobile year. A Mapper catalogues the source fields for each datum and notes that a "name" is in data array elements 0–25, an "automobile make" is in data array elements 26–45, an "automobile model" is in data array elements 46–70 and so forth.

Figure 5:
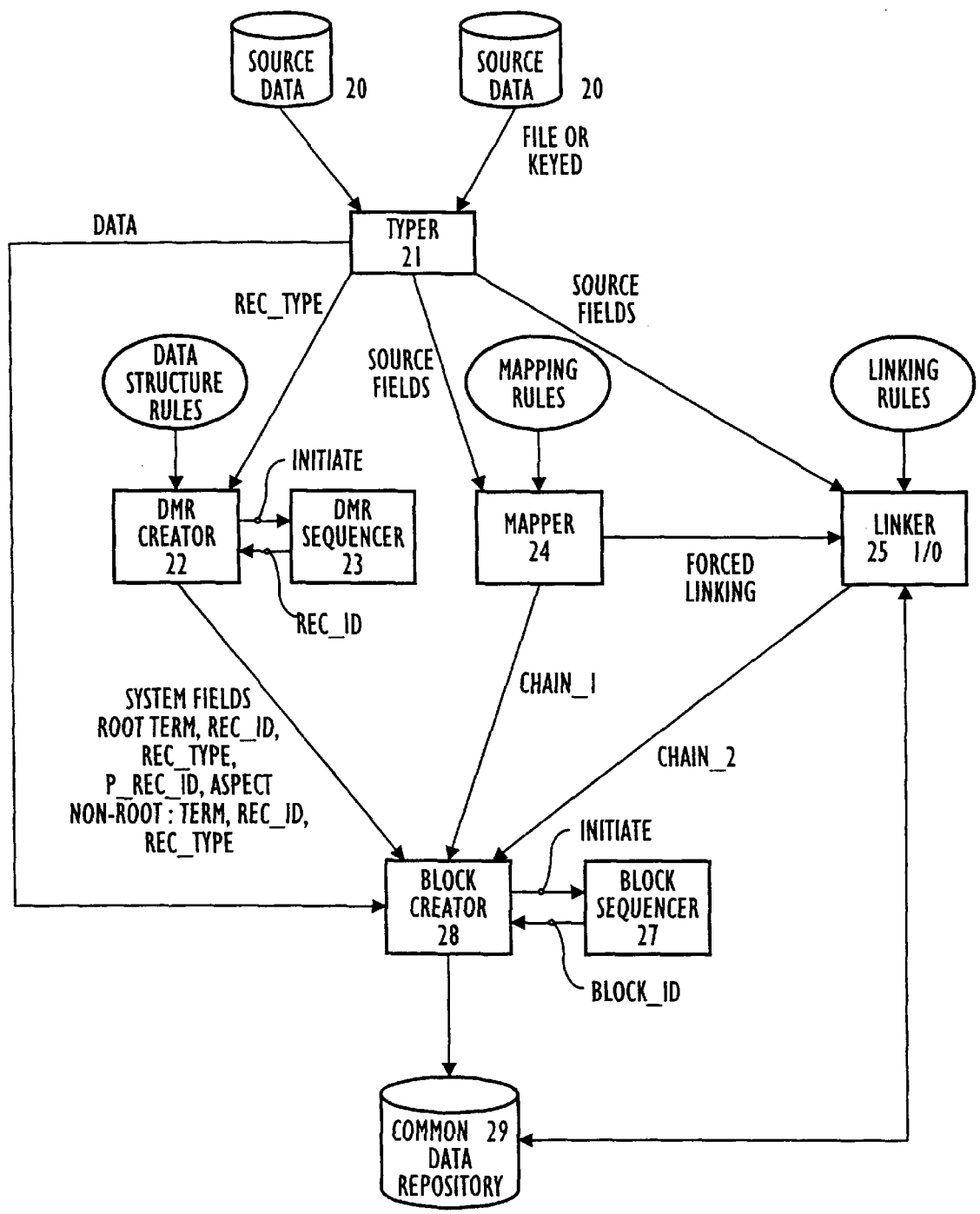
FIG. 5 shows a schematic for a loader.

As is shown in FIG. 5, there are several processes or procedures such as the Mapper, preferably written in the RDBMS 4GL programming language, that control the necessary actions at the DMR level. These systems are all stored by the RDBMS under its file system structure for procedures, and stored in a system's server storage devices.

In the root block situation, all of the fields in the Chain-1 data array are pre-defined by the Record Type "automobiles." Block 51, however, contains information pertaining to purchase orders. In block one 51, the Chain-1 data array contains look-up references to shipping addresses, date of order, date order filled, item number, quantity, and color. In block two 52, the data array contains look-up references that describe payment methods, type of payment and subtotal, tax, shipping, and total. When used by another program, whether in a create record sequence or look-up record query sequence, the Mapper will use the block ID information held in the internal system area to negotiate to succeeding blocks.

Each DMR also contains a unique Chain-2 data array that contains Record Identifiers and specifies network linkages of certain fields across hierarchies. Chain-2 data arrays are contained per DMR; they are specific to each DMR, not just to any block, and they contain internal system fields to identify and associate the array to the DMR. For example, the "owners" elements in Chain-1 of the root block in the DMR in FIG. 2 have a Chain-2 network linkage to Record Identifier 550 to a DMR with the Term "U.S. Telephone Directory." The Chain-2 also lists the Record Identifiers to the parents of the directly-linked DMR, such as Record Identifier 547 to a DMR with the Term "North American Telephone Directory" and Record Identifier 593 to a DMR with the Term "Global Telephone Directory." The Chain-2 data array also contains a direct network linkage from "item number" look-up references in the Chain-1 of block one 51 to a DMR with the Term "Catalog" and other direct network linkages from "color" look-up references in the Chain-1 data array of the root block 50 and block one 51 to a DMR with the Record Identifier 647 and the Term "Color Chart."

Again, the list of direct linkages in the Chain-2 data array are augmented by the Record Identifiers of the parents of the directly-linked DMRs. Chain-2 data arrays may be used to link not only related DMRs, but Chain-2 linkages may also be used as a gateway to processes such as ordering a document, downloading a file, or starting an electronic mail subsystem. The contents of the data array would be made up of the particular commands required to perform the specific action. For example, to download a file, the data array would contain the specific commands to connect, open the file, and close the file. The Chain-2 data array, which is per DMR, is contained in the file structure of the preferred embodiment. For instance the "total" look-up references in block two 52 could be network linked to a "print receipt" process.

FIGS. 3 and 4 show examples of disparate source structures. Source table A represents manufacturer orders of automobile parts. The fields available in source Table A are: dealer number, date of order, customer name, year of car, model of car, item number, quantity, and warranty information. Source table B represents automobile replacement parts orders. The available fields in Source table B are: name, address, make, model, catalog number, description, color, quantity, price per item, subtotal, tax, shipping, total, payment type, and account number.

FIG. 5 shows a schematic for a loader that can be implemented on a computer. A loader as shown in FIG. 5 can load data from disparate data sources with disparate record structures into a single data repository. The loader can take the source tables shown in FIGS. 3 and 4 and integrate them into a single DMR as shown in FIG. 2.

Note that the "customer name" field in source Table A contains the same type of information as the "name" field does in source Table B. Also, the "model of car" field in source Table A contains the same type of information as the "model" field of source Table B. Using this information, the loader can blend source Tables A and B into a cohesive whole for use in, for example, a "Customer Orders—Automotive" DMR, while allowing managers and users of the individual systems to operate on the individual systems as if the original systems were unchanged.

Source data 20 can be either derived from a pre-existing table transferred using magnetic tape or other machine structure or keyed into the loader using a computer keyboard. A typer 21, preferably implemented by a 4GL program on file, inspects the source data and segregates the source data according to source fields and source records using field delimiters (for example, a TAB character) and record delimiters (for example, a hard RETURN character). The segregated data is sent to a Block Creator 28, preferably implemented by a 4GL program on file. The typer also determines an applicable Record Type, such as persons, locations, documents, or projects, from the types available for this database. According to a preferred embodiment, there are 1,000 available Record Types, each having a unique programmable format.

The Record Type is sent to the DMR Creator 22, preferably implemented using a 4GL program on file, which initiates a call to a DMR Sequencer 23, which is preferable a 4GL program on file that maintains and generates a unique sequence for Record IDs. The DMR Sequencer 23 returns a unique identifier for each DMR to be created by the DMR Creator 22. The DMR Creator 22 establishes the system fields for a DMR, such as Term, Record Identifier, Record Type, Root Record Identifier, and Aspect. These system fields are also sent to Block Creator 28.

The names of the source fields used in the source data 20 are sent from the typer 21 to the mapper 24. The mapper 24 places look-up references to data in the Chain-1 data array based on Mapper rules and the source field names. Field names are stored inside the Root block of that field's DMR. A Chain-1 data array element may be forcibly linked to a DMR using the Chain-2 data array based on the name of the source field. For example, data from a source field "item number" in the Chain-1 data array of block one may be forcibly linked to a DMR with the Term "Catalog." Also, data from a source field named "colors" in the Chain-1 data array of block one may be forcibly linked to a DMR with the Term "Color Chart." As a final example, data from source fields named "make" and "model" in the Chain-1 data array of block two may both be forcibly linked to a DMR containing a taxonomy of automobile classifications.

In addition to forced linkages between hierarchies, links between hierarchies may be made based on a set of linking rules 27 preferably stored as a 4GL program on file. The linker 25 may survey the hierarchies already residing in the common data repository 29. The linker looks at the Chain-2 data arrays of all the associated hierarchy DMRs in the repository using the single key alphabetical index. It scans the array for the current Record ID to see if any mention a link that applies to the current rules. If they do, then these associated DMRs are entered into the current DMR's Chain-2 data array as having additional links to these other DMRs. Depending on the results of this survey, the linking rules may direct the linker 25 to enter into a Chain-2 data array appropriate network pointers similar to pointers 141-45 shown in FIG. 1.

Once the Block Creator 28 receives data from typer 21, system fields from DMR Creator 22, Chain-1 data array from mapper 24, and Chain-2 data array from linker 25, the Block Creator 28 can construct blocks to form a DMR. The Block Creator 28 is preferably a 4GL program on file. When completely constructed in memory, blocks are stored in the RDBMS. The Block Sequencer 27 returns a unique block identifier for each block to be created by the Block Creator 28. Preferably, the Block Sequencer 27 is a 4GL program on file that maintains and generates a unique sequence for Record IDs. The DMRs are hierarchically linked according to instructions found in each root block. The data is then stored in a common data repository 29.

The preferred embodiment may support large-scale multi-user information services that require real-time operational management and limited downtime. Prior database systems may require that the data be taken off-line before changes to field and record definitions can be made. This period of down-time is not only inconvenient for users, but it can also result in significant loss of revenues to the information provider.

Because the source field and source record definitions do not define the storage of data in the common data repository, a manager may add data, add Block Types, add Record Types, and assign new fields while the system is still on-line. Essentially, a manager may make any modification that does not affect currently an open DMR. Interaction to the system can occur in three different manners: (1) through a new script processing language developed for the system; (2) through embedded ANSI standard SQL scripts executed from within the new script processing language; and (3) through the included RDBMS commands and features, which can only be performed against the RDBMS database, not the system as a whole. All three of these methods use script files written with any standard editor.

For example, if an information manager would like to add a field to a DMR, the system simply modifies the mapping rules to specify the new field. This does not affect any users of the DMR at the time. However, if a manager seeks to make modifications such as adding data that would affect an open DMR, the preferred embodiment would prevent the modification from occurring at that time. The preferred embodiment would delay the implementation of the modification until the DMR was not being accessed. Alternatively, the system could simply bar the manager from trying to make the modification at that time.

Although an RDBMS relates, searches, and finds data as it is in the database flat file, the return of the data is ordered by the contents of the index used to search it (or with an "order by" clause). The preferred embodiment uses both a horizontal and vertical "connecting" of the data through the horizontal and vertical structures, and it is this extra horizontal index based on the vertical index key that adds order to the resultant return set.

The system uses a "unified index structure." The preferred embodiment uses a "unified single key alphabetical index" into which every common repository DMR is placed. This index is held in the traditional RDBMS that is incorporated "under" the system and stored on a server s storage devices. The unified index structure operates in at least two dimensions. Preferably, the first dimension, horizontal, allows single-key indexing all of the DMRs as one numeric index according to Record Identifier. The relational structure 3 (shown in FIG. 1) is the structure used to establish and maintain the single-key index. Because the unified index structure is pre-established, associations between DMRs can be determined by working with only the single-key index. The actual data do not need to be retrieved from the common data repository 29 until the relational operations are completed. This unified index structure provides quick retrieval for even the most complex queries, minimum processing overhead for the database server, and the ability to segment the processing overhead on multiple processors in a multi-processor or client-server environment.

In a second dimension of the unified index structure, vertical, the preferred embodiment uses matrix operations and filtering to refer to any block within a DMR as a subset of the first dimension of the unified index structure. The linker 25 (shown in FIG. 5) associates field names with other DMR hierarchies to augment second-dimensional links between DMRs. This single-key index can be manipulated to establish sorts within sorts, relational structures, query results, and other operations.

Figure 6:
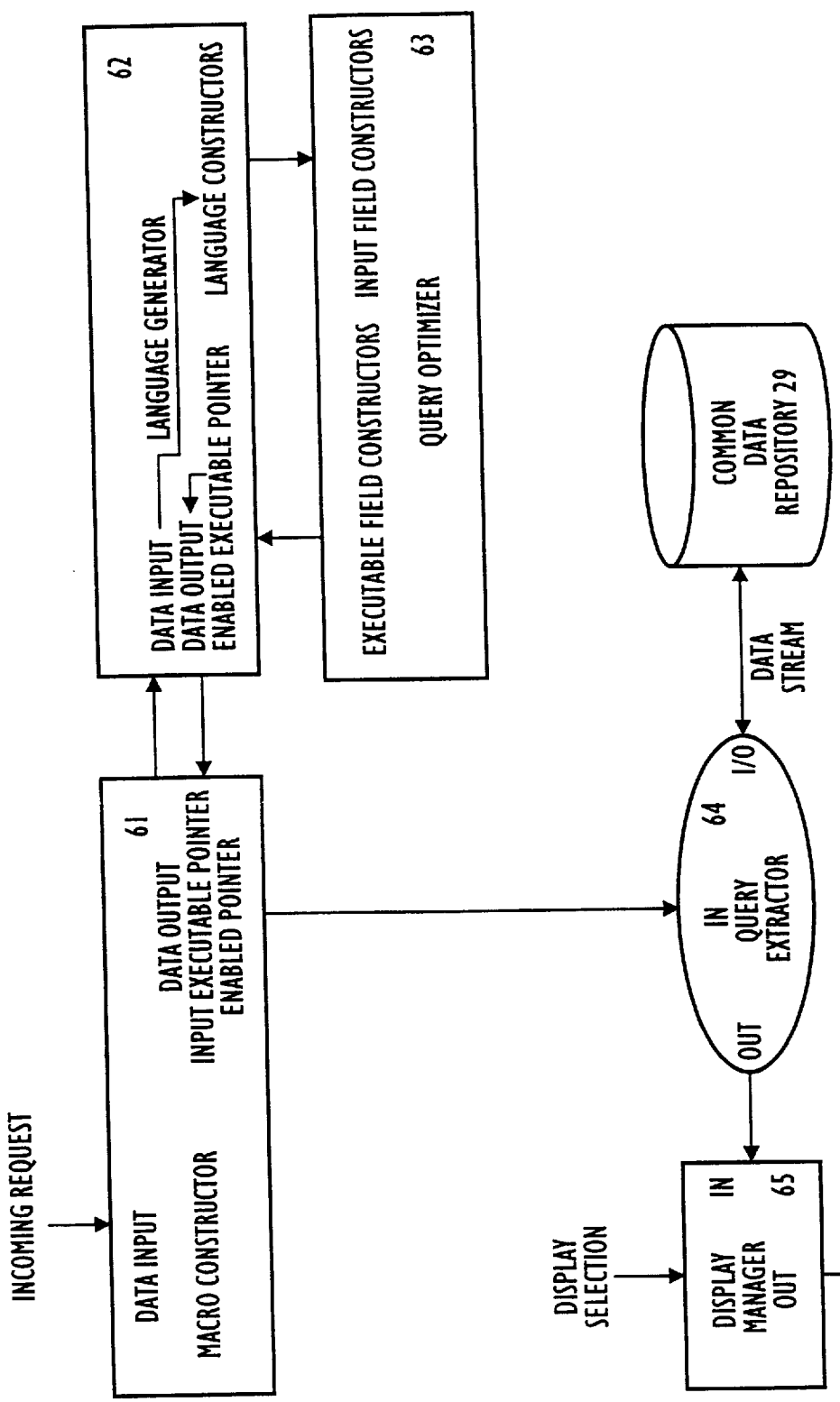
FIG. 6 shows a schematic for a query engine.

FIG. 6 shows a schematic for a database management system query engine that can be implemented using a computer. A user begins a query by constructing a request using boolean query language (AND, OR, NOT, <, >, =, etc.) and variables such as character strings, Record Types, and field names. This incoming request is sent to the Macro Constructor 61, preferably a 4GL program on file, which parses the incoming request into its constituent boolean operations and variables. This data output is sent to a Language Generator 62, preferably implemented using a 4GL program on file, which translates the boolean operations into an executable address. The translated query is sent to the Query Optimizer 63 preferably implemented using a 4GL program on file, which creates an optimized executable search and simultaneously checks the query for validity. The Query Optimizer returns an executable pointer address relating to the query, which is then sent to the Macro Constructor 61. The Macro Constructor 61 enables the Query Extractor 64 to survey the common data repository 29 for the requested variables.

The Query Extractor 64, preferably a 4GL program on file, matches found query variables against the single-key horizontal index, which means when a user queries the common data repository, the Query Extractor will find the results in reference to the Record Identifier. The Query Extractor 64 then performs any nested query operations resulting from Boolean operations. If the Record Identifier references a DMR that satisfies the query, the Record Identifier is passed to the Display Manager 65. If the Record Identifier does not satisfy the query, the Record Identifier is not passed to the Display Manager 65. The Query Extractor continues to survey the common data repository 29 until no more Record Identifiers are returned.

The Display Manager 65, preferably implemented using a 4GL program on file, formats the query results according to the display selection preferred by the user (or the default display selection). The default display selection format preferably shows query results according to Record Identifier, Term, and Record Type. Other display selection formats could be either a listing by Record Type only, or a listing by Term only, or even a listing by source table. The output of the Display Manager goes to a display such as a monitor. The display selection may also control the display border, the margins, the font, and the colors used in the display.

In a sample query, a user may inquire who assisted Mark Daniels in purchasing automobile tires. The Incoming Request may be: "Mark Daniels" AND "tire" AND "hierarchy (12)". Depending on the sophistication of the Language Generator 62, a query variable that is a name (e.g., "Mark Daniels") may result in a search for the surname alone (e.g., "Daniels"), or matching first and last names with or without a middle name or middle initial (e.g., "Mark" within 2 of "Daniels").

After translating the Incoming Request into an optimal executable pointer using Macro Constructor 61, Language Generator 62, and Query Optimizer 63, the query engine will traverse DMRs in hierarchy 12 for references to "Mark Daniels" and "tires" in the Chain-1 and Chain-2 data arrays.

Next, the query engine will search the common data repository 29 for every entry of "Mark Daniels" to find every data array (Chain-1 or Chain-2) that contains a look-up reference to "Mark Daniels." Once a first DMR is found that corresponds to the variable "Mark Daniels," the Record Identifier of that DMR is returned to the Query Extractor 64. The Query Extractor 64 will inspect the Chain-1 and Chain-2 arrays of that DMR for a reference to "tire." If the DMR contains a reference to "tire," the Query Extractor 64 inspects the DMR for a Chain-1 or Chain-2 reference to "hierarchy (12)." If the DMR contains references to all three variables, the Record Identifier is sent to the Display Manager 65 for appropriate display. If at any time the Query Extractor 64 finds that the DMR does not contain a query variable, the Query Extractor 64 does not pass the Record Identifier to the Display Manager 65.

If the common data repository 29 responds that "Mark Daniels" is in a Chain-1 data array of a DMR, the query engine has found a look-up reference to "Mark Daniels," because look-up references are stored in Chain-1 data arrays. Possibly, the Chain-1 data array is associated with the customer "Names and Addresses" DMR 111 shown in FIG. 1. Next, the Query Extractor 64 looks for query request variable "tire" in either the Chain-1 or Chain-2 data array of the found DMR. If "tire" is found in a Chain-1 data array, the query engine has found a single DMR with look-up references to both "Mark Daniels" and "tire." Finally, the Query Extractor 64 looks for a reference to "hierarchy (12)" in the Chain-1 and Chain-2 data arrays of the found DMR. If the Query Extractor 64 finds such a reference, the Record Identifier of that DMR is passed to the Display Manager 65.

Finding a query variable in a Chain-2 data array signifies that the found DMR contains a network reference pointer to the variable, because only network references are stored in a Chain-2 data array. Perhaps a network reference pointer to "hierarchy (12)" is stored in the Chain-2 data array of the "Customer Orders—Automotive" DMR 116. At this point, DMR 116 containing two variables, "Mark Daniels" and "tires," in a Chain-1 data array and the final variable, "hierarchy (12)," in a Chain-2 data array is also passed to the Display Manager 65.

In this example, the query engine may return many Record Identifiers, each containing a reference to "Mark Daniels" AND "tire" AND "hierarchy (12)." There may be multiple "Mark Daniels" entries in the common data repository 29. Also, the query engine may return DMR references to automobile tires, bicycle tires, or other types of tires, because the query does not specify a certain type of tire.

Figure 7:
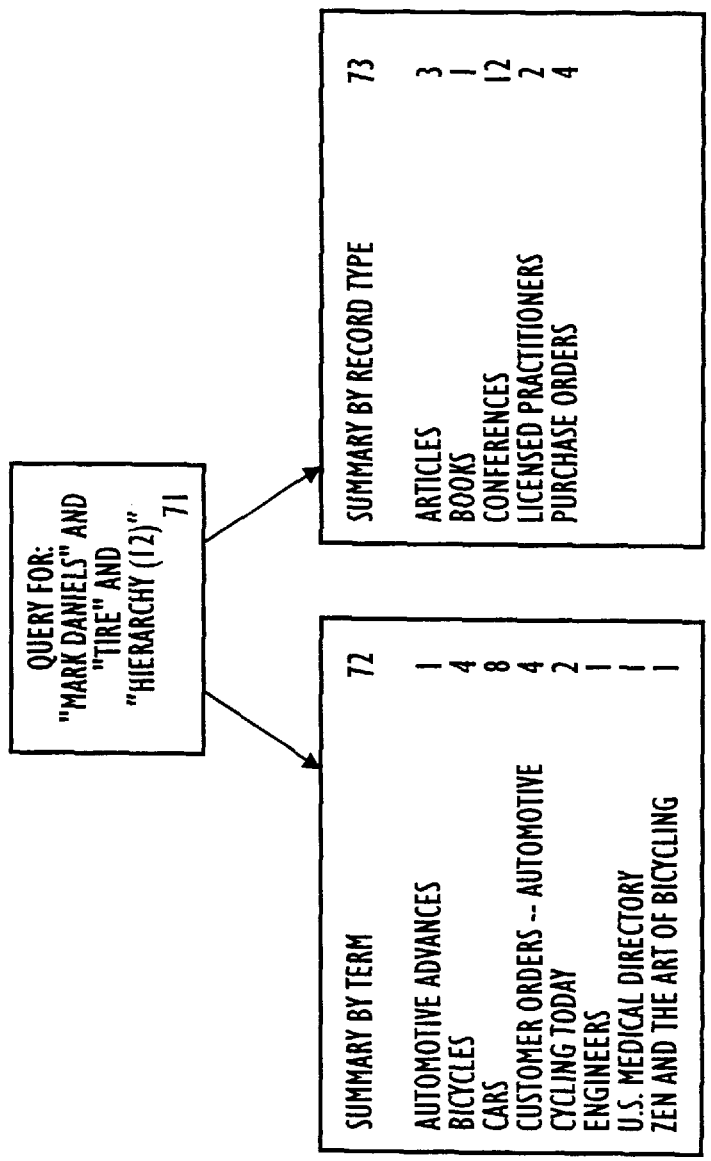
FIG. 7 shows query results.

FIG. 7 shows query results. The display will usually show the Term of the DMR containing the Chain-1 result as shown in screen 72. The user, however, can instruct the system to display different information as the query result, such as the Record Type as shown in screen 73. A found DMR's Term in this case could be "Customer Orders—Automotive." The user could check that DMR to find the entry that the user was specifically looking for. However, there could be other DMRs which contain "Mark Daniels" and "tire" and "hierarchy (12)," and a user could enter those DMRs later. Note that in the preferred embodiment the query results are displayed in alphanumeric order.

At this point, the user of the system could enter the "Customer Orders—Automotive" DMR 116 (from FIG. 1) and look for Mark Daniels, which could be highlighted or otherwise indicated. The user can also immediately link from "Customer Orders—Automotive" DMR 116 (from FIG. 1) in another hierarchy and go to "tires", which may be highlighted. The user of the system may or may not know that the entry "tires" is not in the same hierarchy or DMR from which the user is presently operating.

After the query engine completes its report, a user can browse through a selected hierarchy with only minor processing. The user may see additional two-way pointer references to other DMRs containing a look-up reference for "Mark Daniels" in the Chain-1 data array. The user can immediately look at all the references and know that Mark Daniels is linked to DMRs with Terms such as "Universities" and "Companies." A user can also maintain the reference to "tire." By maintaining this reference, a user keeps a filter on while perusing down the "Customers" hierarchy 11 (from FIG. 1) and network linkages. So, "tire" will always appear, and the user can look for types of tires such as radial tires, snow tires, or bicycle tires.

The Display Manager 65 (from FIG. 6) may display an updated summary of query responses as the user travels through different hierarchies. As a user traverses hierarchies and perhaps enters a hierarchy that contains fewer and fewer query variables, the updated summary will show that fewer and fewer DMRs contain results of the query.

FIG. 8 shows a rights matrix. The preferred embodiment rights matrix is a Progress RDBMS table used at the system level for subsystem control. Another aspect of the preferred embodiment is multiple control domains within the common data repository. Most databases offer two levels of basic security (user vs. nonuser & user vs. superuser). The preferred embodiment provides an additional level of security through individual subsystem operational control. A rights matrix controls access and use of the subsystems and the discrete functions encompassed in those subsystems. FIG. 8 shows eight levels of security, with level 8 being analogous to a superuser. The preferred embodiment can support any number of security levels with preferably the highest security level having access to all subsystems. Within a subsystem, a manager at level 6 may use the functions for creating, deleting, and modifying DMRs as well as creating, deleting, and modifying fields. In the rights matrix, each subsystem as well as its underlying functions appears as a discrete element. This enables a manager to decide exactly which rights are assigned to certain user groups on a function-by-function basis. Every request to access a function is matched against the rights matrix before the function can be performed. User level and subsystem requested are looked up in the rights matrix table for permission.

The preferred embodiment also provides a second level of security which is DMR-specific—controlling the security of data, the format of data, and the usage of data on the DMR level. This resident intelligence, located in a Chain-4 data array (shown in FIG. 2) section of a DMR, is programmed by the application owner and the data owner and interacts with the rights matrix. A manager may determine which DMRs have read/write privileges for certain user groups. A manager may determine whether to allow others to modify a DMR or even reply to notes in a conference. This level of control enables a manager to have complete control in a shared system. For example, in FIG. 2, case 1 shown in Chain-4 does not allow a user access to block two 52, having BLOCK_ID=4314, which may contain sensitive financial information. Case 2 shown in Chain-4 of FIG. 2 is applicable to a user having a color monitor.

By utilizing control properties of a DMR to trigger "events," the system can establish formats for a particular DMR, create associations (or pointers) to other data, implement security controls, and trigger applications for use with a particular DMR. For example, the control property could load an appropriate word processor and display a file in the word processor format when a manager retrieves a "word processing text file" from one of the variable length fields in a block. In the same manner, a document image contained in a DMR field could be automatically displayed by the appropriate graphic image display application. In another type of control property usage, accessing a DMR imported from an Oracle™ database could trigger a control event to check the remote database for the last time the DMR was updated.

Figure 9:
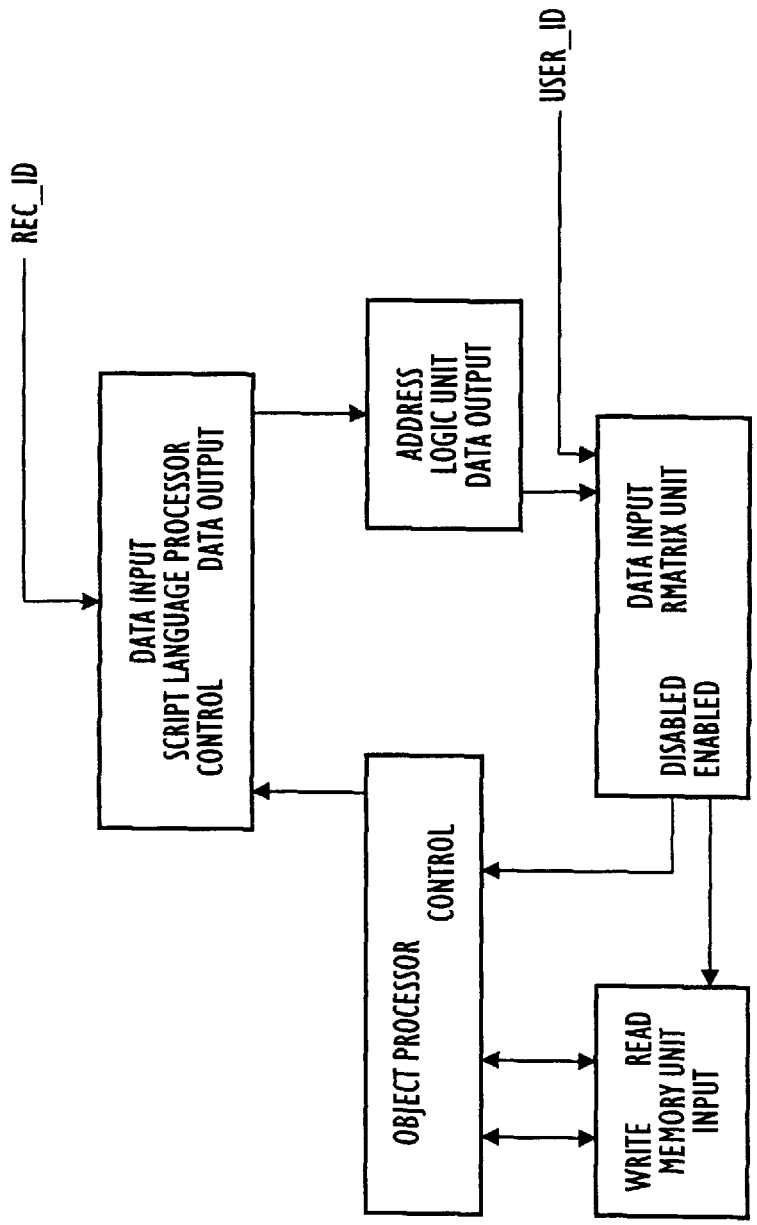
FIG. 9 shows a schematic for an intelligent DMR command executor.

FIG. 9 shows a schematic for an intelligent DMR command executor. Intelligent commands (triggers) are held in the system DMR Chain-4 data arrays. If a user processes a DMR with Chain-4 array content that performs an action, then that action will "trigger." If a user trips a DMR trigger, the Record Identifier of the DMR is sent to the script language processor 81, preferably a 4GL program on file, which starts the operation of the resident intelligence in the DMR Chain-4 arrays. The various triggers include: requesting to read data in a DMR, traversing through a DMR to see hierarchical children DMRs, traversing back through a DMR to see hierarchical parent DMRs, using a DMR as a menu, requesting to trigger the DMR directly, and editing the DMR.

These triggers are in the context of an event-driven model. When a trigger is tripped, the user starts an event that completes a particular action. On the other hand, there are data-driven models, where data can reprogram the user interface. For example, if the data value of the field matches a criteria held in the Chain-4 array, then the instructions to download and execute a new version of the user interface "xx.exe" file could be performed, which would result in a "reprogrammed" user interface. The system merges the event-driven model with the data-driven model by allowing an event to gather or rearrange information, and then allowing that information to dictate the user interface. The information returned by the event could allow a DMR to act as a menu, a filter, or a gateway to other DMRs. In this situation, the user interface responds to the data returned by the event.

Once a trigger is tripped, the Record Identifier is sent to the script language processor 81. The script language processor inspects the Chain-4 of the DMR for instructions corresponding to the trigger that was tripped. These instructions, if present, are sent to the logic unit 82 for translation into executable code. The output of the logic unit 82 is sent to a rights matrix unit 83 that checks whether the instruction can be performed based on the user ID. If the instruction cannot be performed by the user, a disabled signal is sent through the object processor 85, and control returns to the script language processor 81. If, however, the rights matrix unit 83 sees that the user is allowed to perform the requested event, an enable signal is sent to memory unit 84, and the memory unit controls the read/write capabilities to the object processor 85. The object processor 85 may include controls to print, alter data, or change the views display. The Chain-4 instructions can also direct the DMR to act as a menu, a folder, or a branch point to another gateway.

For example, a search for "Mark Daniels" AND "tire" AND "hierarchy (12)" finds 23 DMRs. In that context, a trigger of requesting to read a particular DMR could direct the front end view system to present detailed order information (including addresses and account numbers) for a user who is employed to take those orders. If, however, the user is not employed to take orders, the view system may only present a summary of all the orders in the DMR and omit sensitive information such as addresses and account numbers.

In another instance, two types of users, User A and User B, may be looking at the same initial DMR. From that DMR, both users may trip the same trigger, but User A might take one path and see a submenu with certain options listed while User B might see a submenu with completely different options listed. This branching depends on the instructions programmed in the Chain-4.

The view and reporting preferences of each user can also be fused with the Chain-4 instructions programmed by the application owner and the data owner. Each user may have a personalized set of views and preferences including screen color preferences and border styles. Therefore, identical events triggered by User A and User B create very different results partly determined by the data owner and partly determined by the preferences of the user.

Thus, the system may develop, integrate, and administer large and complex databases using hierarchical, network, and relational structures. This system may, of course, be carried out in specific ways other than those set forth here without departing from the spirit and essential characteristics of the invention. Therefore, the presented embodiments should be considered in all respects as illustrative and not restrictive and all modifications falling within the meaning and equivalency range of the appended claims are intended to be embraced therein.

We claim:

1. A computer storage device for storing a data modeling record comprising:
   a root block stored in the computer storage device, wherein the root block has a Chain-1 data array for containing data look-up references; and
   a Chain-2 data array stored in the computer storage device for containing two-way network linkages.

2. A device according to claim 1 further comprising:
   a non-root block stored in the computer storage device, wherein the non-root block has a Chain-1 data array for containing data look-up references.

3. A device according to claim 1 further comprising:
   a Chain-4 data array stored in the computer storage device for containing instructions regarding data access.

4. A memory for storing data for access by an application program comprising:

a database management record data structure stored in the memory including:
  a root block stored in the memory, the root block containing a first data array with look-up references to data stored in a common data repository; and
  a second data array stored in the memory, the second data array containing two-way pointers to other database management record data structures.

5. A memory for storing data for access by an application program according to claim 4 comprising:

a third data array stored in the memory, the third data array containing additional look-up references to data stored in a common data repository.

6. A memory for storing data for access by an application program according to claim 4 comprising:

a fourth data array stored in the memory, the fourth data array containing instructions regarding data access.

* * * * *